(12) United States Patent
Pulnikov

(10) Patent No.: US 9,130,437 B1
(45) Date of Patent: Sep. 8, 2015

(54) METHOD OF MANUFACTURING MULTILAYER METAL WIRE OR RIBBON BANDAGE OVER OPERATIONAL ZONE OF ROTOR

(75) Inventor: Sergey Pulnikov, Villingen-Schwenningen (DE)

(73) Assignee: Sergey Pulnikov, Villingen-Schwenningen (DE)

( * ) Notice: Subject to any disclaimer, the term of this patent is extended or adjusted under 35 U.S.C. 154(b) by 330 days.

(21) Appl. No.: 13/547,263

(22) Filed: Jul. 12, 2012

(51) Int. Cl.
| | |
|---|---|
| *H02K 1/27* | (2006.01) |
| *H02K 1/28* | (2006.01) |
| *H02K 3/51* | (2006.01) |
| *H02K 15/02* | (2006.01) |
| *H02K 15/03* | (2006.01) |
| *H02K 15/12* | (2006.01) |
| *H02K 17/16* | (2006.01) |
| *H02K 15/00* | (2006.01) |
| *H02K 3/46* | (2006.01) |
| *H02K 3/48* | (2006.01) |

(52) U.S. Cl.
CPC ............ *H02K 15/02* (2013.01); *H02K 15/0012* (2013.01); *H02K 15/03* (2013.01); *H02K 15/12* (2013.01); *H02K 1/2706* (2013.01); *H02K 1/278* (2013.01); *H02K 1/28* (2013.01); *H02K 3/46* (2013.01); *H02K 3/48* (2013.01); *H02K 3/51* (2013.01); *H02K 17/165* (2013.01); *Y10T 29/49012* (2015.01)

(58) Field of Classification Search
CPC ....... H02K 3/51; H02K 1/278; H02K 17/165; H02K 1/12706; H02K 1/28; H02K 3/46; H02K 3/48; H02K 15/0012; H02K 15/02; H02K 15/03; H02K 15/12; Y10T 29/49012
USPC .................................................. 310/262, 271
See application file for complete search history.

(56) References Cited

U.S. PATENT DOCUMENTS

| | | | |
|---|---|---|---|
| 6,751,842 B2 * | 6/2004 | Roesel et al. ................... | 29/598 |
| 7,042,118 B2 | 5/2006 | McMullen et al. | |
| 2008/0238234 A1 | 10/2008 | Saban et al. | |
| 2009/0261678 A1 | 10/2009 | Sortore et al. | |

* cited by examiner

*Primary Examiner* — Livius R Cazan

(57) ABSTRACT

A manufacturing method for permeable bandages and magnetic cores for rotors of electrical machines is proposed. The proposed method relies on winding with insulated metal preferably permeable wire or ribbon with high pretension and maintaining pretension in the wire or ribbon during manufacturing steps. The proposed method could be especially useful for high-speed electrical machines.

11 Claims, 10 Drawing Sheets

METHOD OF MANUFACTURING MULTILAYER METAL WIRE OR RIBBON BANDAGE OVER OPERATIONAL ZONE OF ROTOR

1. BACKGROUND OF THE INVENTION

This invention is related to permeable bandages and magnetic cores for rotors of rotating electrical machines. The proposed method could be especially useful for high-speed electrical machines.

The proposed method could be used for containment of permanent magnets, for containment of magnetic cores with permanent magnets, for containment of metal squirrel cages of high speed induction machines, for containment of electrical windings installed in the slots of the rotor, for closing rotor slots or even as a mean of assembly of complex rotors consisting of separate parts or sectors through compressing and containing these parts or sectors against a shaft.

Permanent magnets located on rotors of electrical machines often require containment sleeves. Such containment sleeves can be performed out of metal as described in US 2008/0238234 A1 and U.S. Pat. No. 7,042,118. Solid sleeves provide a path for eddy currents, which increases the rotor temperature. In US 2009/0261678 A1 segmentation of the metal containment bandage is suggested. This however does not exclude eddy currents completely. With respect to assembly of such a rotor, it becomes more complex, since each ring has to be mounted using thermal expansion. The utilized mounting procedure also requires very tight tolerances. Because of eddy currents and increased leakage of permanent magnets it is not practical to use permeable metals or alloys in solid or segmented containment metal bandages. So either Inconel or other non-magnetic materials are typically used in such bandages. This increases the non-magnetic space between the magnets and the inner surface of the stator. So in order to achieve required flux density in the air-gap of such a machine an additional volume of permanent magnets would be required.

It is also possible to use composite sleeves preferably based on carbon fibers, since these materials are strong and light. Use of such bandages is suggested, for instance, in U.S. Pat. No. 6,459,185. However use of composites also leads to some problems. The composites are normally electrically non-conducting or possess high resistivity if carbon fiber is used. This means that practically no electrical currents would be generated in a composite sleeve. But this also means that no shielding would be present for the magnets against pulsations of magnetic field in the air-gap due to typically slotted stator structure and/or because of current pulsations in the stator winding. Composites are also non-magnetic. This means that the non-magnetic space between the magnets on the rotor and the inner surface of the stator is equal to the sum of the thickness of the mechanical air-gap and the composite sleeve thickness. In order to force the main magnetic flux of the machine through this non-magnetic space and maintain required level of the flux density in the air-gap a larger volume of permanent magnets would be required, compared to a situation when sleeve is manufactured out of a permeable material. A larger volume of the magnets obviously requires a thicker containment sleeve. This increases the cost of the machine and decreases the resonance frequency of the rotor, which eventually restricts the achievable operational speed of the machine. Composite sleeves also have fairly poor radial thermal conductivity. So a larger cooling flow would be required in order to cool the rotor. Generally speaking, composite sleeves put a limit on achievable power density in high speed permanent magnet machines.

In high-speed induction machines there is a need to contain a conducting preferably copper squirrel cage, because of very high centrifugal forces. Since induction machines are very sensitive to the value of the air-gap, the containment bandage should preferably be permeable, eddy-current free and capable of sustaining large operational temperatures. Since neither non-magnetic metal containment cylinders described above, nor composite bandages satisfy these requirements, no squirrel cage is typically used in high-speed induction machines. This adversely affects performance of high-speed induction machines.

Some machines utilize rotors with an electric winding, like, for instance, synchronous machines and DC machines. The rotor winding is located in slots of a magnetic core of the rotor. These slots are often made open or half-open in order to facilitate insertion of the winding into the slots. However such a slotted rotor structure can have a negative effect on the machine performance. A permeable bandage around the rotor would smoothen the effect of slots on either side of the air-gap of the machine.

High speed machines often utilize active magnetic bearings. Magnetic bearings exert magnetic forces in order to maintain position of the rotor. Good dynamic operation of magnetic bearings requires an eddy-current free magnetic core on the rotor. This requirement is important, because eddy currents dampen rapid changes of magnetic flux in the magnetic circuit of the bearing, reduce operational frequency range and generally deteriorate performance of such a bearing. Conventional laminated cores are suitable for active radial magnetic bearings. However such configuration is not suitable for alternating axial magnetic flux. There are also other applications requiring 3D eddy-current free permeable cylindrical magnetic cores.

2. SUMMARY OF THE INVENTION

The present invention offers a solution for aforementioned problems and limitations through the use of metal wire or metal ribbon directly wound on a rotor or a part of the rotor with pretension in order to overcome centrifugal forces acting on such a bandage and provide contact pressure on the rotor in order to maintain its position in the operational range of speeds and, if necessary, fulfill its containment function. In case of magnetic cores for the rotors only centrifugal forces have to be overcome.

A metal wire of square, rectangular or flat shape should preferably be used in the proposed method. It is also possible to use amorphous ribbons. Winding with a round wire also lies in the scope of the proposed invention, but such a winding would have worse magnetic properties and thermal conductivity in the directions perpendicular to the wire. A hexagonal wire could also be used for the proposed invention. The first end wire is fixed on the rotor and the wire is wound under pretension. After the winding is finished the wire is fixed again. The fixations are done in order to fix the wire and maintain the applied pretension.

Such a permeable bandage could also find its use in conventional electrical machines where high centrifugal speeds are not encountered. The magnetic field created by the stator is not smooth and uniform because of the slotted structure. This disadvantage could be reduced if stator slots were performed closed. However this is not always practical, because of the difficulty of putting a stator winding in closed slots. Rotors can also have a slotted structure and thus have the same problem with pulsations of magnetic field generated by such rotors. Like in case of stators, rotors with open slots are preferable for manufacturing, but they also give higher pulsation of magnetic field in the air-gap. The use of a permeable bandage over the rotor would help reducing effects of slots both on the stator and on the rotor. Through decreasing of magnetic field pulsations in the air-gap, torque ripples, noise and magnetic losses could be reduced.

Rotors can also have permanent magnets. In case of rotors with surface permanent magnets pulsation of magnetic field could occur in the air-gap due to abrupt change of magnetization direction between neighboring magnets. In addition to that magnets are often installed with a gap between them, which causes a local drop in magnetic field. Pulsations of magnetic field in the air-gap adversely affect operation of electrical machines by causing additional magnetic losses, torque ripples and noise. The overall efficiency and performance of such machines is therefore reduced. With a permeable metal wire bandage over the rotor, magnetic field pulsations are reduced and performance of the machine is improved.

As will be demonstrated further, the steel wire bandage can also incorporate conductive metal sheets for shielding of the rotor.

Such a bandage can provide a path for magnetic leakage, which in some applications should be avoided. The leakage could be prevented by reaching saturation of material of the bandage along leakage paths. This could be achieved by selecting material with reduced saturation flux density for the bandage. Alternatively, wires of non-magnetic material could be integrated into the bandage in order to reduce effective saturation level of the bandage. At the same time the saturation level of the bandage could be high enough for the main flux of the motor.

3. DESCRIPTION OF THE DRAWINGS

4. DETAILED DESCRIPTION

Figure 1:
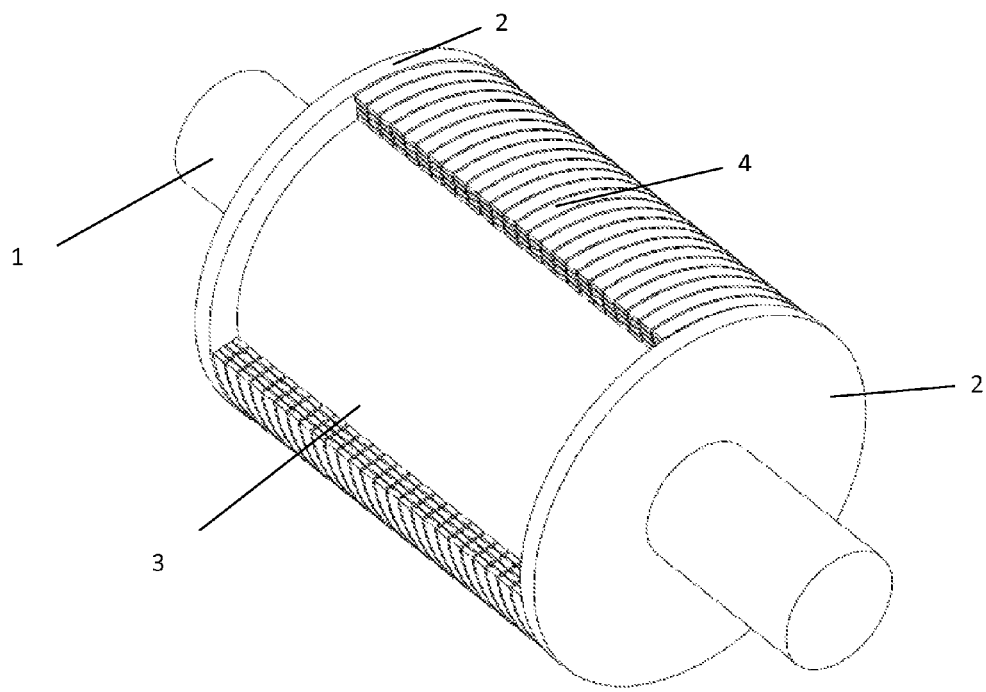
FIG. 1 shows a general structure of a rotor with a steel wire bandage.

A general rotor structure with a steel wire bandage is shown in FIG. 1. Here only the active part of the rotor (1) is considered. The active part is restricted by two side rings (2). This is necessary in order to stabilize the sides of the steel wire bandage. The side rings do not have to be solid, but are allowed to contain slots or holes, if this is necessary for operation or for manufacturing purposes. The operational area for the bandage is indicated by (3). Although the operational area is expected to be cylindrical, some minor deviations could be permitted. This however would also depend on the type and especially conformity of the wire used for the winding. The bandage itself is denoted by (4). It can be shown that practically any rotor could be adjusted in order to fit the basic requirements of the proposed technology. Some of such adjustments will be presented. However it does not have to be concluded that the proposed technique is restricted to the considered rotor structures. The emphasis is put on high speed machines, because these machines have high power density and consequently higher mechanical loads. Application of the proposed technique for conventional machines having lower power density is less challenging and therefore fairly straightforward.

Figure 2:
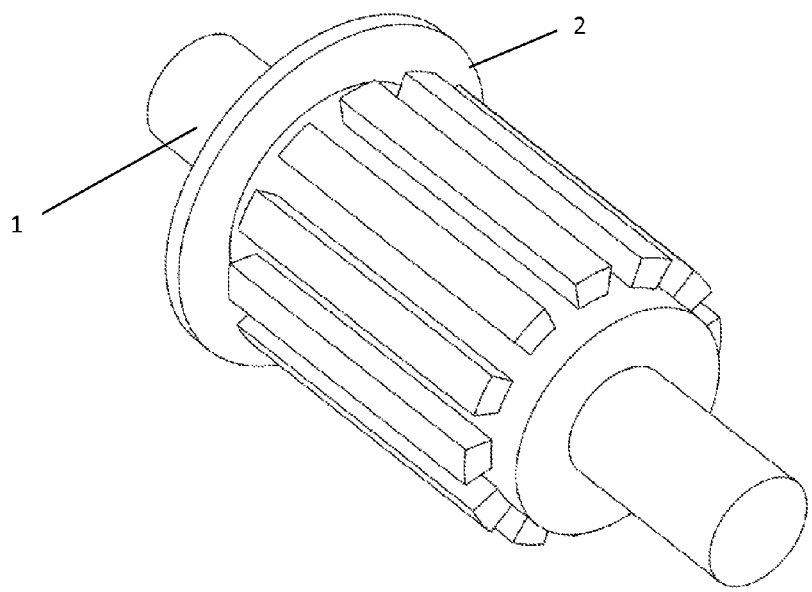
FIG. 2 shows a rotor with a side ring and slots for a squirrel cage.
Figure 3:
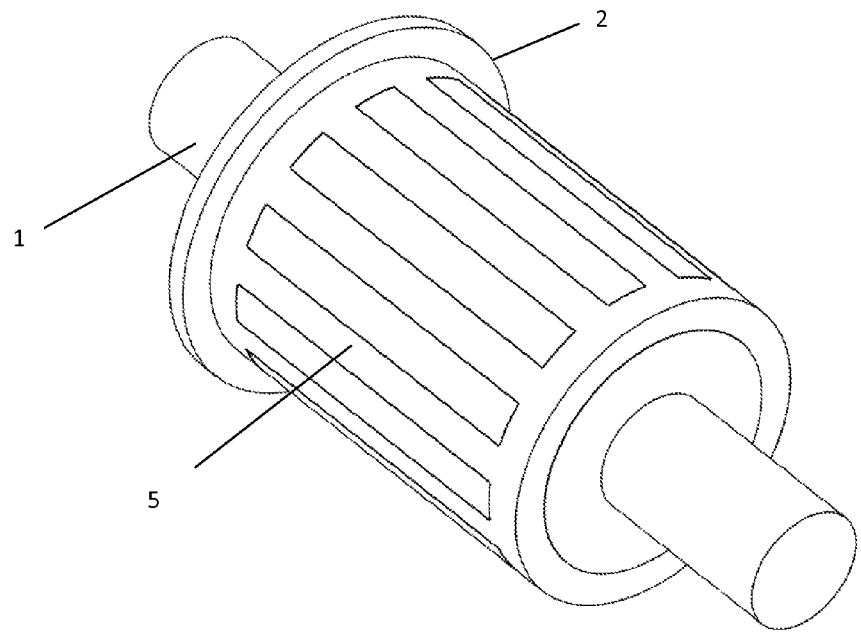
FIG. 3 shows a rotor with a side ring and a squirrel cage in slots.
Figure 4:
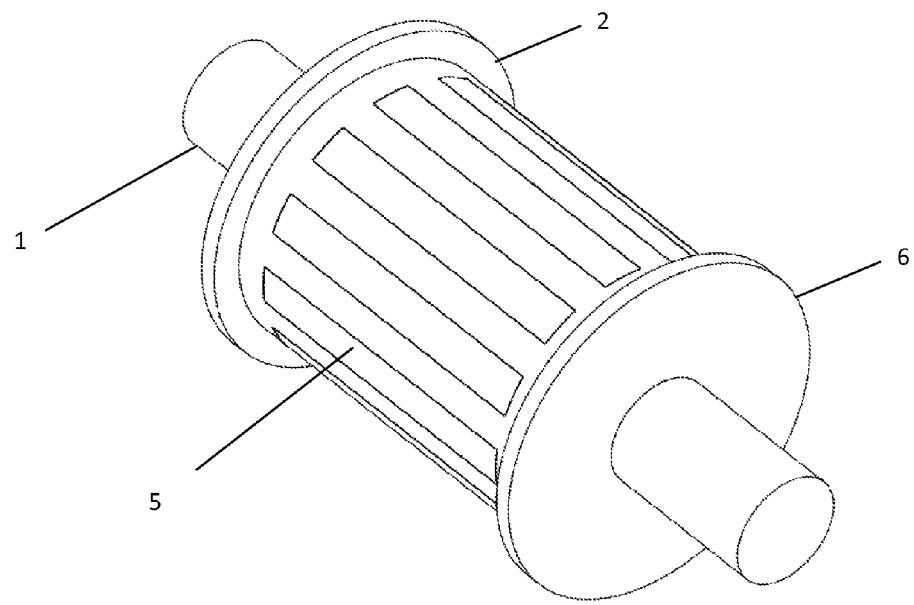
FIG. 4 shows a rotor with side rings and a squirrel cage in slots.
Figure 5:
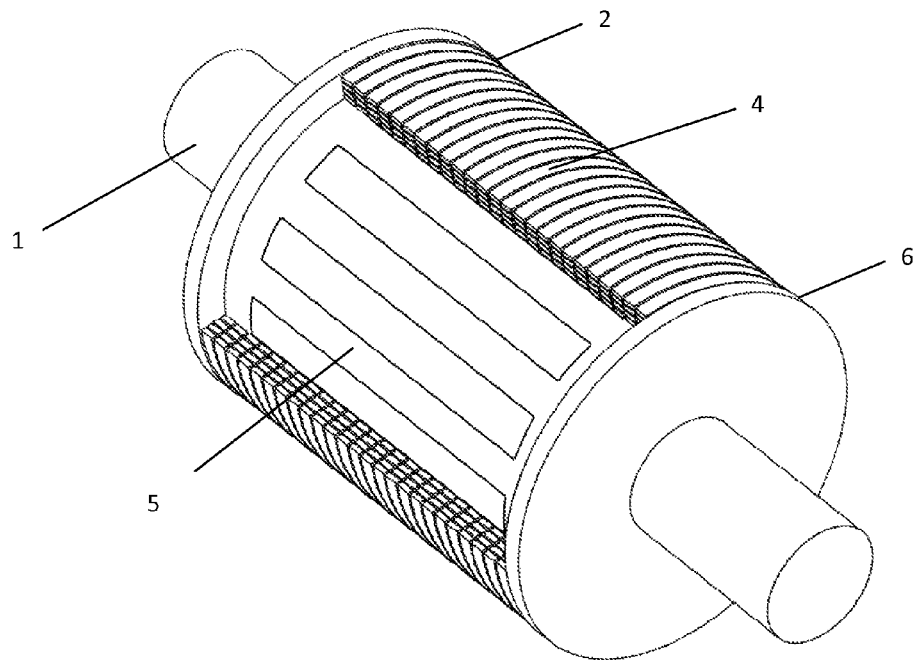
FIG. 5 shows a rotor with side rings, a squirrel cage in slots and a steel wire bandage.

As mentioned earlier, high speed induction machines are usually produced without a squirrel cage, because neither copper, nor aluminum, typically selected as material of the cage, are capable of sustaining large centrifugal forces arising at operational speeds of such machines. With a steel wire bandage this problem can be solved, but before that the rotor has to be adjusted for winding. One of possible adjustments is demonstrated in FIGS. 2-5. Axial slots and radial grooves are machined on the rotor as shown in FIG. 2. It is also possible to obtain teeth not through machining, but by installing separate possibly laminated parts on a cylindrical rotor. After that a squirrel cage (5) is manufactured using obtained slots as demonstrated in FIG. 3. As the first side ring (2) is a part of the shaft, the second side ring (6) has to be mounted on the rotor as indicated in FIG. 4. Of course, it is possible to keep the both side rings as a part of the shaft. However it is also possible to use them as separate pieces. The rotor is now ready for winding a steel wire bandage (4), which is shown in FIG. 5. Instead of machining the slots, the rotor could also have a magnetic core installed, as this is usually done for conventional induction machines. The first side ring could also be installed separately. Instead of manufacturing a squirrel cage, a few layers of conducting preferably copper foil could be wrapped around cylindrical operational zone. In this case a steel wire bandage is wound directly on top of the conducting foil. Anyway, the basic requirement of providing a largely cylindrical operational area (3) that is supposed to be compressed and two axial restrictions in the form of side rings (2) or (6) can generally be satisfied.

Figure 6:
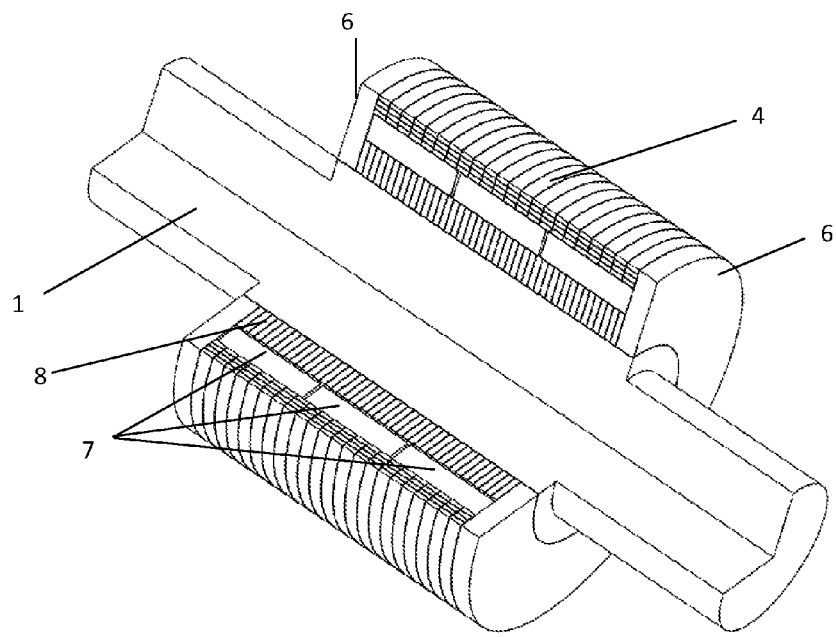
FIG. 6 shows a rotor with side rings, laminated core, permanent magnets and a steel wire bandage.
Figure 7:
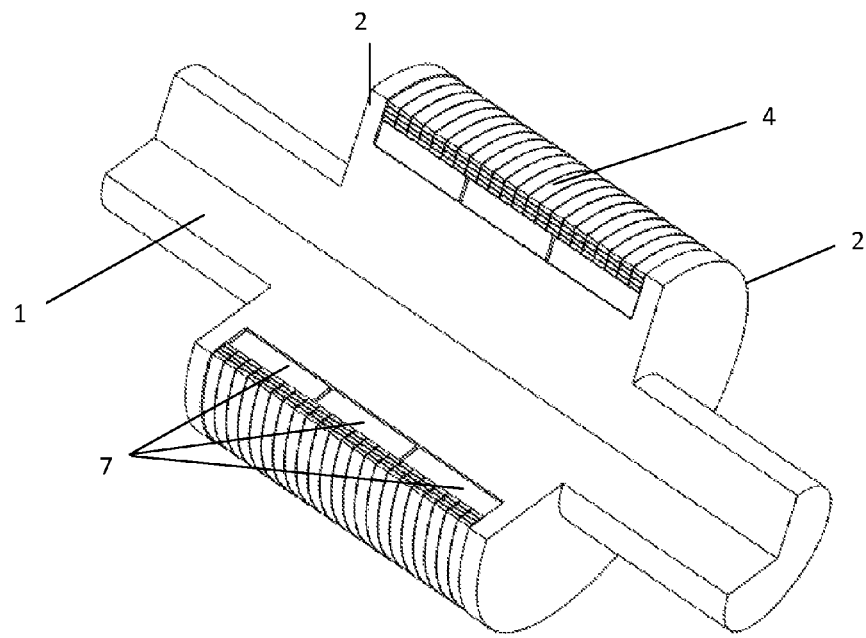
FIG. 7 shows a rotor with side rings, permanent magnets and a steel wire bandage.

Rotors with permanent magnets (7) could also be adjusted in order to fit the aforementioned requirement as shown in FIGS. 6 and 7. The rotor may contain magnetic core (8) (FIG. 6) or have magnets directly installed on the shaft (FIG. 7). For permanent magnet rotors there are many possible configurations. For instance, there are cases, when magnets are used as cylinders in order to simplify the assembly. Practically in all these cases the motor would benefit from the presence of a permeable containment bandage on the rotor. The benefits regarding overall motor performance have been explained in the previous section. In addition to that, the presence of external compression would help containing centrifugal forces acting on the rotor, rotor core and/or magnets. Modern grades of steel wire are capable of sustaining pretension of more than 2 GPa making steel wire bandages very efficient as a source of contact pressure. With such a bandage available some elements of the rotor structure could be made mechanically weaker.

With respect to magnetic cores for active magnetic bearings, side rings could be made of composite materials, like carbon fiber-epoxy or glass-fiber epoxy. Of course, another element or a component installed on the rotor at a suitable location could also be used as a side ring. Since the use of magnetic bearings is not restricted to electrical machines, it should not be understood that the proposed invention is limited to magnetic bearings in electrical machines. For instance, magnetic cores manufactured in accordance with the proposed technique could be integrated into slots of high-speed composite shafts and thus provide a solution for their magnetic levitation.

Depending on the rotor size, rotor type and thickness of the steel wire bandage different approaches could be implemented for fixation of the first end wire. The easiest approach would be to fix the first end wire somewhere in the middle of the operational area and then go with a reduced pretension to the beginning of the first layer of the winding. This part of the winding prior to the beginning of the first layer of the steel wire bandage is denoted as a preliminary winding. The preliminary winding can be carried out with an increased axial step, which means an increased distance between the turns. As winding of the first layer is started the full pretension has to be applied. After a few turns the winding of the first layer of the bandage should be interrupted and the rest of the preliminary winding that is still uncovered by the turns of the first layer has to be cut and removed from the operational zone. Of course, the turns of the preliminary winding underneath the first layer must be properly secured. This is necessary in order to reduce possible distortion of subsequent layers of the winding and improve mechanical, magnetic and thermal contact between the steel wire bandage and the operational zone. The pretension system used during winding should be capable of maintaining pretension also when the winding is stopped. Such pretension systems are available on the market and could be fit into a winding machine.

Figure 8:
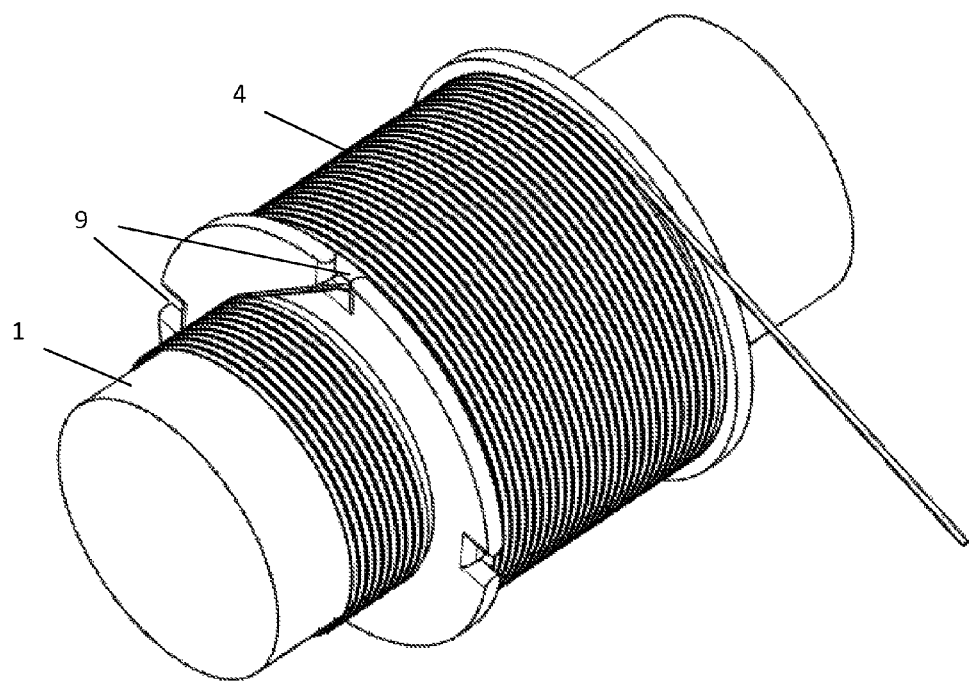
FIG. 8 shows a rotor with side rings, slots in a side ring and radial fixation of steel wire outside of the operational zone.

It is also possible to implement fixation of the first end wire outside the operational zone (FIG. 8). For that at least one slot of configuration (9) must be provided in a side ring. First, the wire is fixed outside the operational zone while no pretension is applied. A temporary radial fixation can be used for fixing the wire. Examples of such a fixation are a few layers of tape or a clamping tool. Transition into the operational zone should preferably be conducted without pretension being applied or with a minimal pretension. Once the wire is in the operational zone, a full pretension should be applied. This should help preventing the damage to the wire during transition. Turns wound before the transition to the operational zone constitute a preliminary winding. After that winding the steel wire bandage could begin. After the third winding layer is started, the first turns of the first winding layer would be properly secured by the contact pressure of the second layer. At this moment the winding could be interrupted. The temporary fixation can be removed and the preliminary winding could be cut and removed from the rotor.

Figure 9:
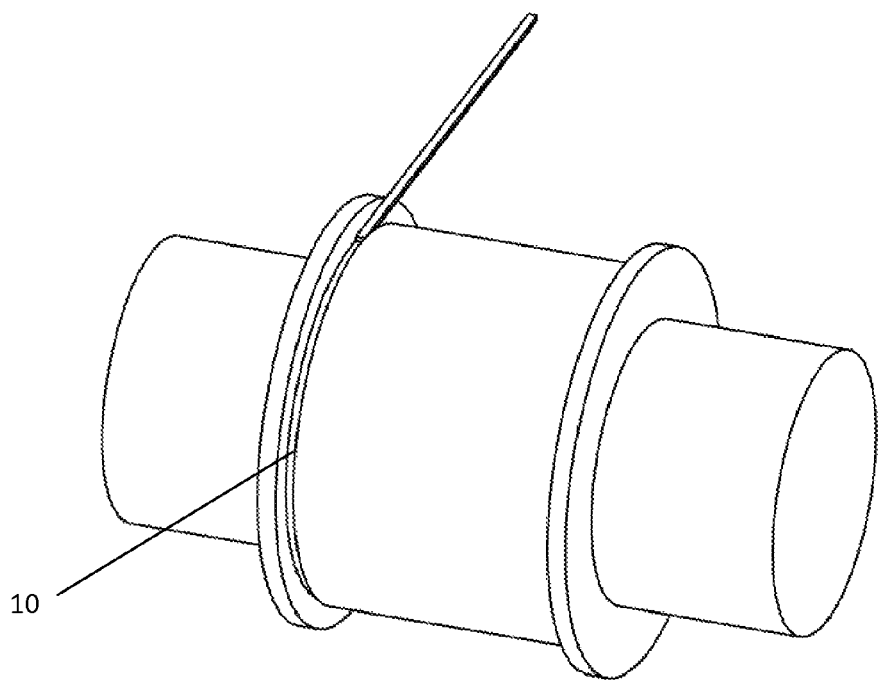
FIG. 9 shows a rotor with side rings and radial fixation of steel wire in a slot in the operational zone.
Figure 10:
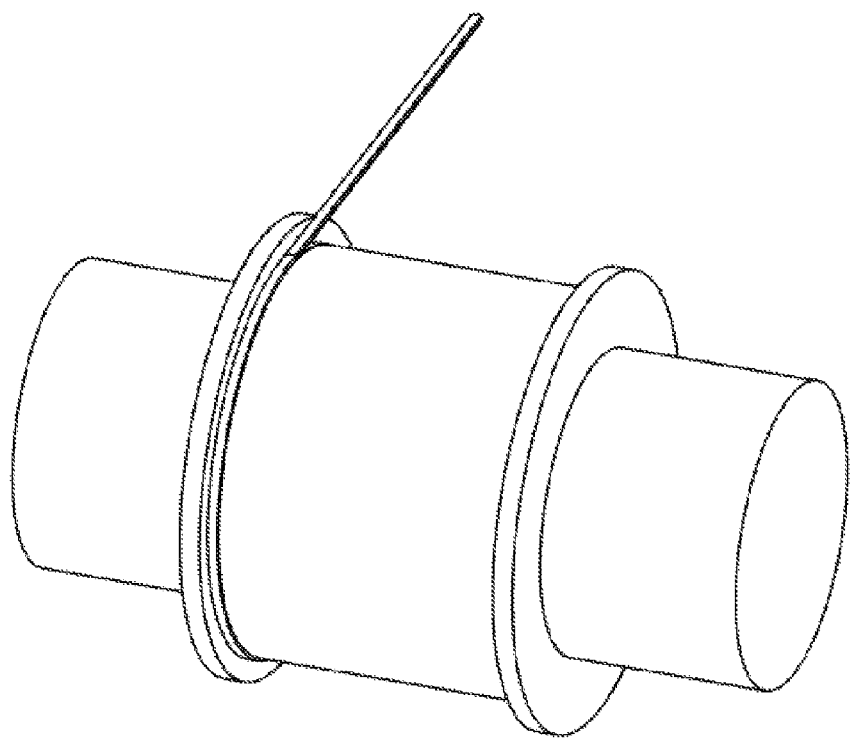
FIG. 10 shows a rotor with side rings and steel wire being wound in the slot in the operational zone.
Figure 11:
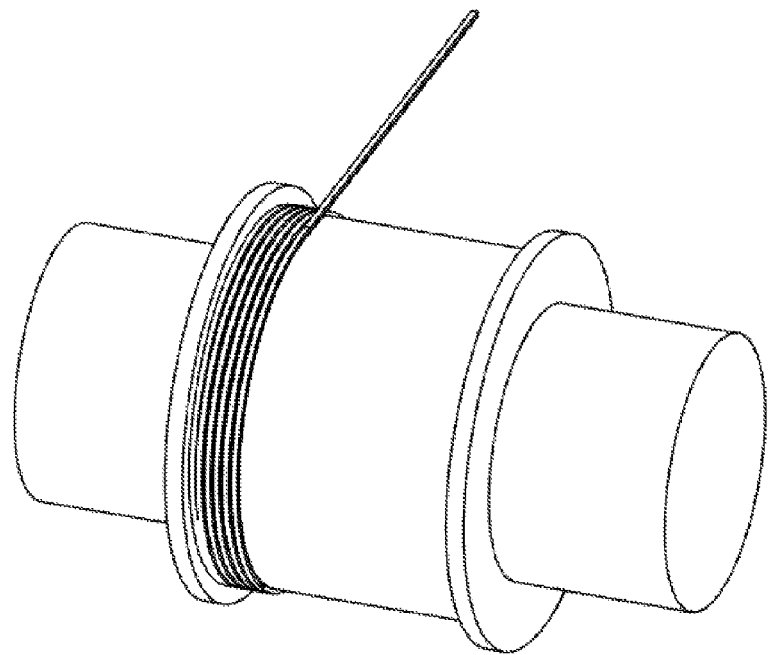
FIG. 11 shows a rotor with side rings and steel wire being wound in the operational zone.

It is also possible to fix the wire in the operational zone without causing any distortion. This can be implemented using a slot (10) at a side ring (FIG. 9). The wire must be fixed at the bottom of this slot. As the winding in the slot progresses (FIG. 10), the pretension can be gradually increased. When the wire reaches diameter of the operational zone, the full pretension should be applied. This requirement will determine the depth of the slot in the operational zone. Winding of the first layer of the bandage is shown in FIG. 11.

The winding should be carried out without overlapping between turns of the wire within the same layer. An axial mechanical contact between turns of the wire would be preferable. Otherwise a minimal axial gap should be maintained between turns of the wire. This would provide high filling factor for the bandage as well as good radial magnetic permeability and thermal conductivity.

Figure 12:
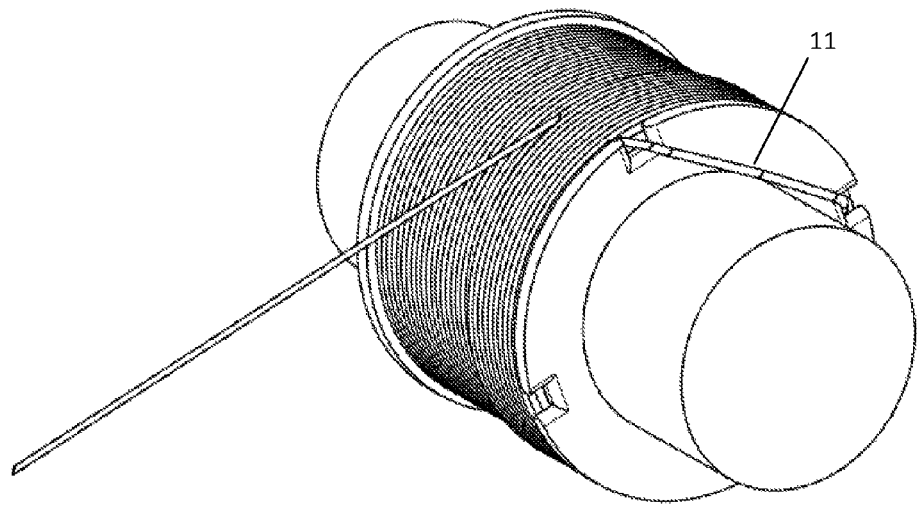
FIG. 12 shows a rotor with side rings, slots in a side ring and steel wire going through a slot in the side ring and back into the operational zone through another slot for axial fixation of the wire.

It is also possible to conduct the winding with a few wires in parallel. However each wire or a ribbon must be provided with a separate pretension system. It is advisable to provide higher pretension to the innermost layers. However this also increases the risk of failure of the wire. In order to diminish the effect of such failures it is recommended to introduce intermediate fixation points. These points could be realized as shown in FIG. 8 or 12. So either radial or axial fixation could be applied. Of course, sharp corners and edges must be removed along the path of the wire. This especially concerns configuration of the slots (9) in the side rings. Intermediate fixation points can potentially slow down the winding process. On the other hand, if a failure of the wire takes place, the winding would not have to be restarted from the very beginning but from the last intermediate fixation point, which would pay off the effort spent on introducing intermediate fixations.

Having intermediate fixation points outside the operational zone will help preventing any distortion in the winding. A part of the winding performed outside the operational zone is further referred as an intermediate winding.

A radial intermediate fixation should be carried out as follows. As a layer of the winding in the operational zone is complete and a side ring is reached, the wire must pass through a slot in a side ring. After that an intermediate winding is started that should consist of two layers. The intermediate winding can be carried out at a reduced pretension. This helps to reduce a chance of the failure of the wire in the intermediate winding. After a few turns the winding could be interrupted and an external fixation installed previously could be removed. After that the first and the second layer of the intermediate winding have to be wound in order to return back to the transition point. The winding has to be interrupted and a temporary mechanical external fixation has to be installed over the intermediate winding. This external fixation could be, for instance, a few layers of tape or a clamping tool. Once the external fixation is finished, the pretension could be removed and the wire could safely pass through a slot in the side ring. Once the wire has reached the operational zone, the wire pretension could be brought back to the nominal value and the following layers of the winding in the operational zone could be manufactured. Though it has not been shown in the figures, the intermediate winding should also have axial restrictions. One of such restrictions is provided by a side ring that serves as a barrier between the bandage and the intermediate winding. On another side of the intermediate winding a temporary barrier could be installed.

An axial intermediate fixation (FIG. 12) should be carried out as follows. After a winding layer is complete, the wire pretension could be optionally reduced. A previously installed external mechanical fixation could be removed. Then the wire could pass through a slot in a side ring. After that the wire (11) could be brought back into the operational zone through another slot in the side ring. A reduction of wire pretension could help decreasing the risk of damaging the wire. After that an external mechanical fixation can be installed clamping the wire against the side ring. Then the wire pretension could be brought back to the nominal value and the winding in the operational zone could continue.

Figure 13:
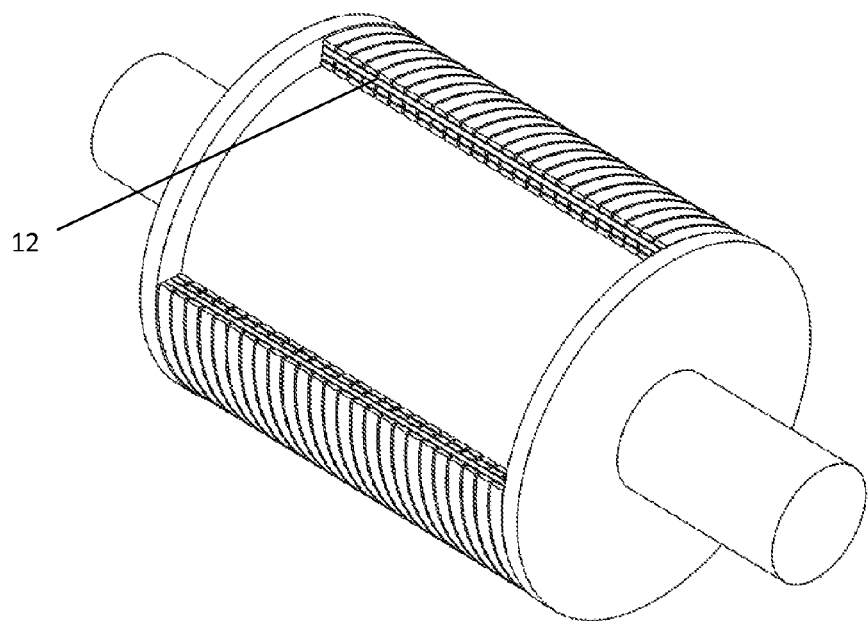
FIG. 13 shows a rotor with side rings, a steel wire bandage and a conducting metal sheet integrated into the bandage.

If electric shielding is required for the magnets against pulsation of current in the stator winding, a metal conductive layer (12) can be introduced into the bandage during winding (FIG. 13). Subsequent layers of steel wire could be used to keep the conductive layer under compression and thereby cancel the effect of centrifugal forces on the conductive layer. So this conductive layer could be made simply by wrapping a few layers of, for instance, copper foil over the corresponding complete layer of the steel wire bandage. Since such a bandage has fairly good radial thermal conductivity, the eddy-current losses in the metal conductive layer could be easily removed by the axial cooling flow in the air-gap.

Figure 14:
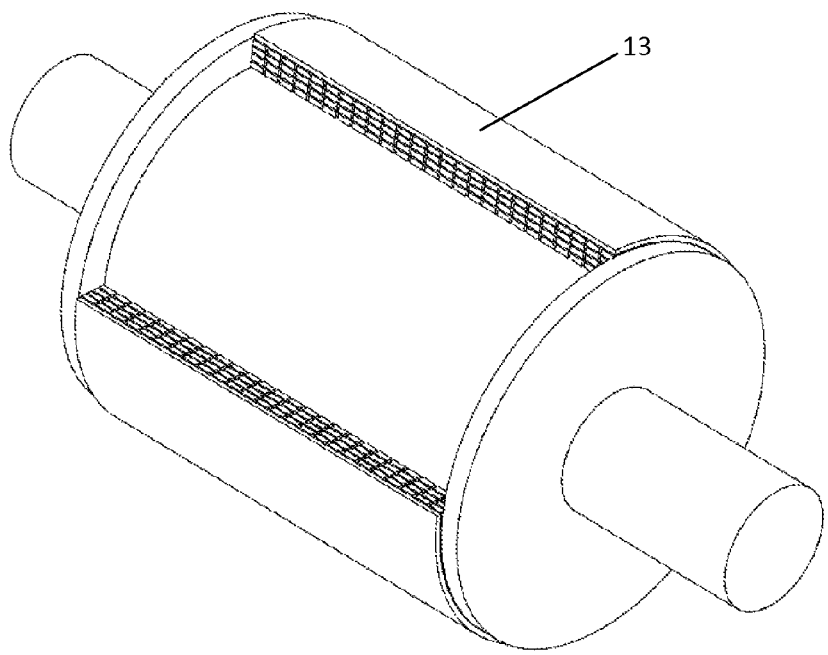
FIG. 14 shows a rotor with side rings, a steel wire bandage and an external protective bandage.

If further improvement of radial thermal conductivity is required, the bandage could be impregnated with a liquid polymer. As the first end wire is fixed and winding has started, some liquid polymer could be poured between the side rings onto the operational zone. While the rotor is spinning the liquid polymer would form a uniform layer over the operational zone. As the winding progresses, more liquid polymer could be added. After the winding is finished, the wire could be fixed using, for instance, a reversed approach to the one shown in FIG. 8. The winding could also be fixed by applying temporary external radial mechanical fixation on the last turns of the last layer. When fixation is finished, the wire could be cut. After that a thin external bandage (13) could be wound on top of the steel wire bandage (FIG. 14) using ultra-high modulus carbon fiber preferably impregnated with the same type of resin as the one used for impregnation of the steel wire bandage. It can be shown that a carbon fiber composite bandage having Young Modulus exceeding 300 GPa will have smaller centrifugal expansion compared to a steel rotor on which this bandage was manufactured. Thermal expansion of such carbon fiber bandages is also much smaller compared to expansion of the steel rotor. So if room temperature is used for curing this bandage, it would maintain contact with the steel rotor in all operational conditions and even provide some contact pressure. This shell would help preventing unwinding of the steel wire bandage, maintain pretension inside the bandage and provide corrosion protection and mechanical protection from external damage. If neither mechanical nor corrosion protection are necessary for the steel wire bandage, the carbon fiber bandage could be wound locally, that is just on a part of the steel wire bandage containing last turns.

If the external radial mechanical fixation applied to the steel wire bandage is compact enough, that is if a few layers of tape were used, it is possible to cover this fixation with carbon fiber impregnated with polymer. After the composite carbon fiber bandage is cured, if the external fixation was not covered by the carbon fiber bandage, the fixation can be removed. Then the last turns of the steel wire till the part covered by the composite carbon fiber bandage could be removed.

Figure 15:
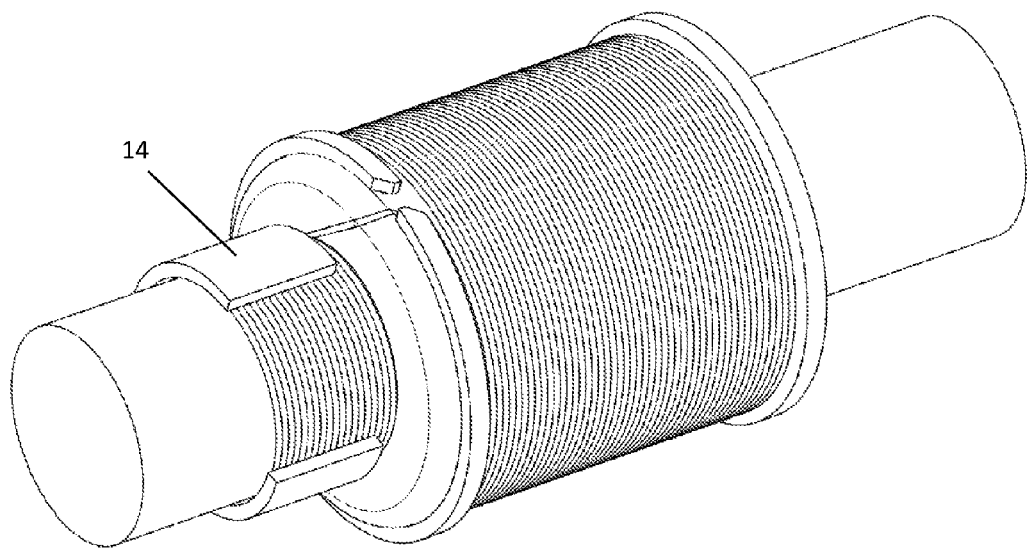
FIG. 15 shows a rotor with side rings, a steel wire bandage within the operational zone, a steel wire bandage outside the operational zone and an external protective bandage outside the operational zone.

It is possible to fix the end-wire outside the operational zone. The wire must pass through a slot in a side ring. After that a few turns must be made. This winding outside the operational zone is referred to as intermediate winding. Then a temporary external radial mechanical fixation has to be applied to the intermediate winding. When fixation is finished, the wire can be cut. After that an external composite shell can be manufactured over the steel wire bandage as described above. Again, the shell can cover the whole outer surface of the bandage or just last turns of the last layer. Instead of manufacturing the shell over the bandage, it is possible to make the shell over the intermediate winding as demonstrated in FIG. 15. The shell should be located between the side ring and the external temporary radial fixation. After the shell is cured, the temporary radial fixation over the intermediate winding can be removed. Depending on location of the shell, either the whole intermediate winding or a part of the intermediate winding uncovered by the shell can also be removed.

Since polymer is used in the external shell, the operational temperature is limited.

For high operational temperatures exceeding 250° C. use of polymers should be avoided. Steel wires with non-organic coating retain their mechanical properties even above 300° C. The only thing that has to be provided here is a thermally and mechanically stable type of fixation of the end wire. Anyway, the type of coating should be selected for the wire in accordance with expected maximum operating temperature.

For conventional machines where centrifugal losses are not that high, a broad range of mechanical fastening systems could be employed and in some cases even welding could be applied. For high-speed applications the external shell (14) in FIG. 15 could be substituted by a metal retaining sleeve. Since this ring is located outside of the operational zone, there is no danger of eddy currents. Besides, at smaller diameter centrifugal forces would also be smaller.

It is also possible to use axial type of fixation as shown in FIG. 12. Notice that as the wire is brought back into the operational zone after passing the second slot in the side ring, a few turns must be wound in the operational zone. These turns after the transition point constitute an intermediate winding. The intermediate winding must be fixed using a temporary external radial mechanical fixation in order to maintain the pretension. After that an extra ring has to be pressed against the side ring in order to clamp the wire between this ring and the side ring with axial pressure sufficient to secure the wire in all operational conditions. Once the wire is clamped the temporary fixation can be removed. The intermediate winding could also be removed.

Figure 16:
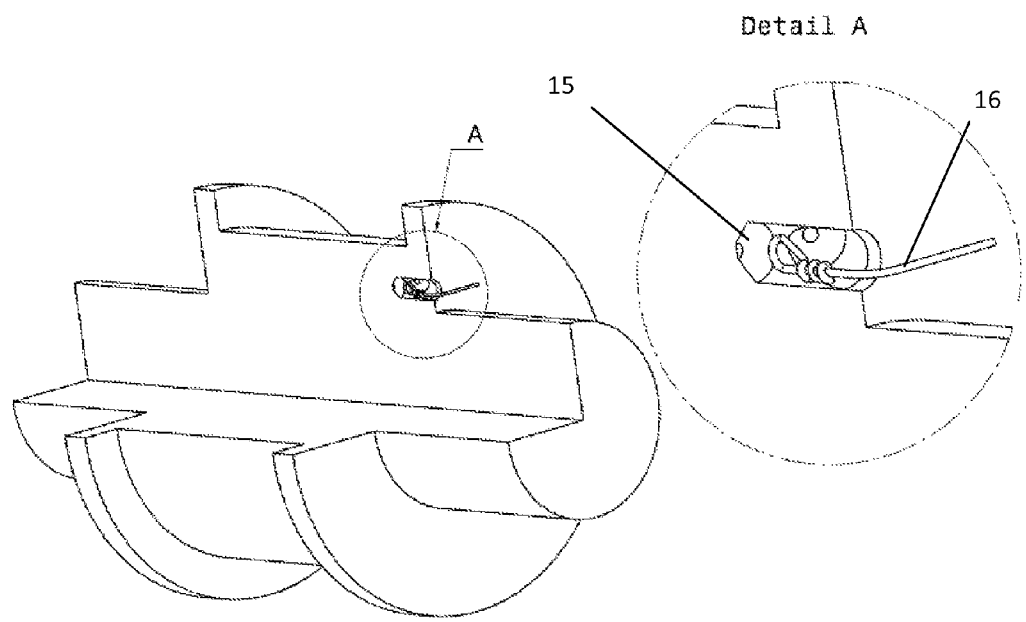
FIG. 16 shows fixation of end wire using two intersecting holes.
Figure 17:
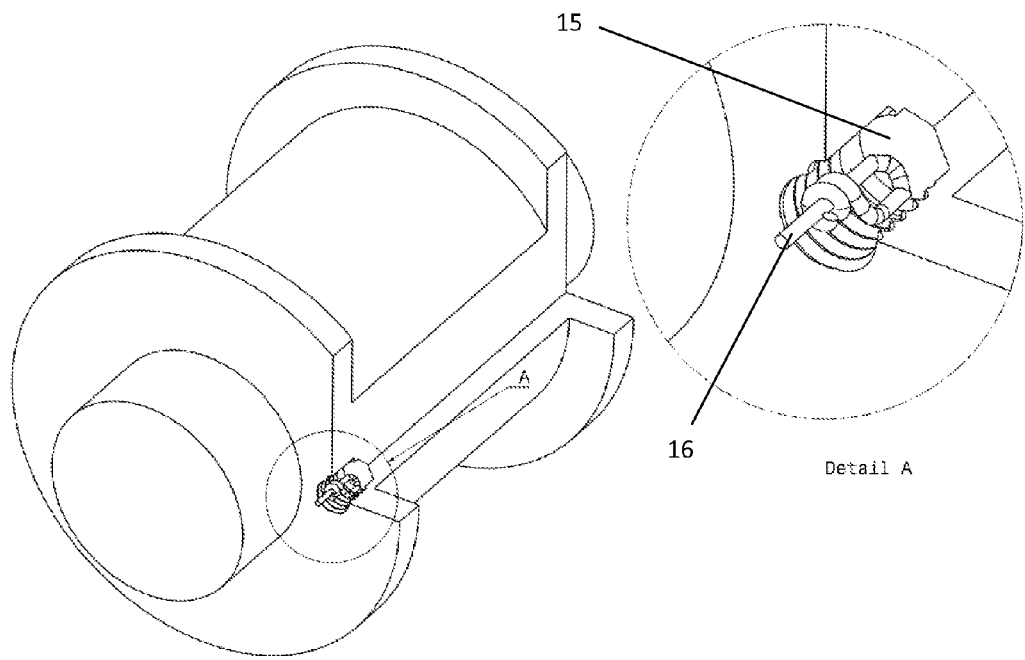
FIG. 17 shows fixation of end wire using two overlapping holes of which one hole is threaded.

It is also possible to utilize internal fixation points in the side rings. A possible configuration is shown in FIG. 16 and FIG. 17. Fixation space (15) shown in FIG. 16 is manufactured using two intersecting holes. One of these holes could be drilled in the axial direction. Another hole should be drilled at an angle. After finishing the winding, a temporary radial fixation should be installed on the last turns of the bandage. After that the wire is cut and a loop is made on the end wire. The wire has to pass a slot in a side ring. After that the end wire with a loop (FIG. 16) is inserted into the fixation space and the hole is filled with liquid metal having suitable melting temperature. At low operating temperatures a polymer or a polymer with suitable filler could be used. Such a fixation would be unextractable unless that metal is melted again or machined away. When fixation is finished, the temporary fixation installed earlier on the last turns can be removed. An alternative solution utilizes two overlapping holes (FIG. 17) of which one hole is threaded. If the end wire (16) is inserted and the holes are filled, such an arrangement would also be unextractable. After the end wire is secured in the fixation hole, the radial fixation over the last turns can be removed.

These types of fixations are presented only to show that providing fixation satisfying certain operational conditions is generally a trivial task and to prove that the proposed technique can actually satisfy various operational conditions and thus solve the problems mentioned in the first section of this invention.

Figure 18:
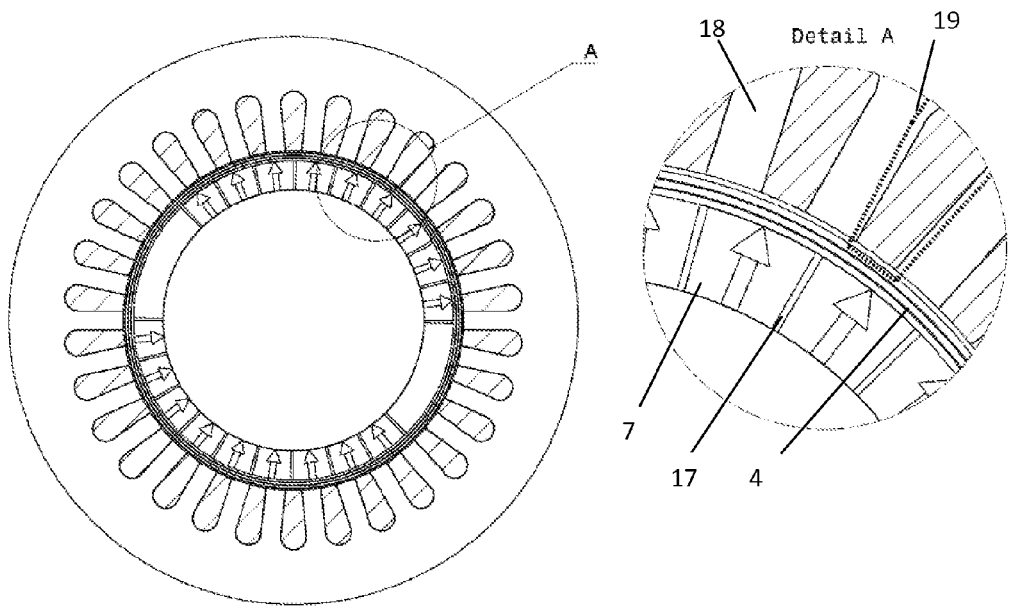
FIG. 18 shows a cross-section of a permanent magnet machine with a steel wire bandage over the rotor.

Benefits of using steel wire bandages are clarified in FIG. 18. A steel wire bandage (4) installed over the rotor with permanent magnets (7) shields the stator from angular change of magnetization direction between neighboring magnets. Magnets are often installed with a gap (17), which also causes a local drop of the flux density. Shielding provided by the steel wire bandage reduces pulsations of the rotor field which would otherwise cause extra losses in the stator core and particularly in the stator teeth (18). On the other hand, the bandage also provides a path for magnetic flux (19) between stator teeth. This is a way for shielding the rotor from pulsations of the stator field due to its slotted structure.

Figure 19:
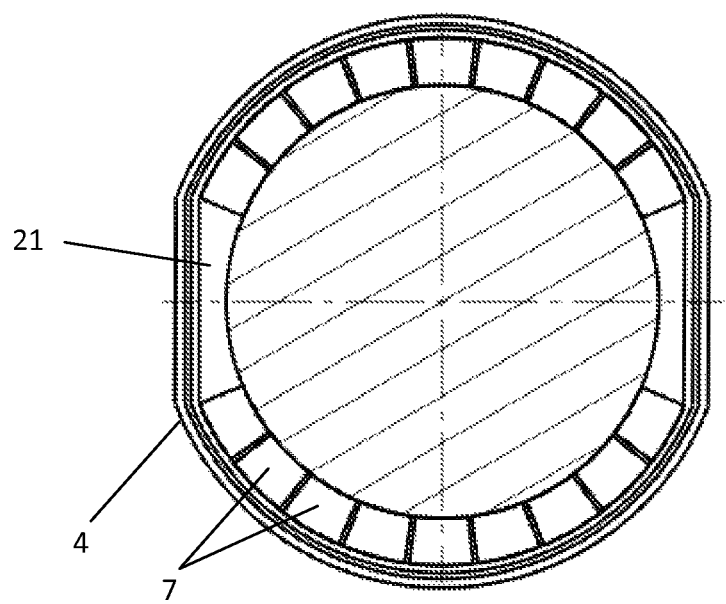
FIG. 19 shows a cross-section of a rotor with permanent magnets and a steel wire bandage over the magnets.

Steel wire bandages have yet another advantage. For conventional premade composite or metal bandages the rotor shape has to be cylindrical. In order to achieve that pole spacers (20 in FIG. 18) are typically installed on the rotor between magnet sets. However as winding with steel wire is performed directly on the rotor and follows the rotor shape, the rotor does not necessarily have to be cylindrical. Therefore with steel wire bandages pole spacers could be either be flattened, or omitted (21 in FIG. 19), or filled with a polymer. Corresponding corners of the first and the last magnets in each set have to be rounded in order to avoid damage to the wire. As an extra precaution, the first winding layer could be wound with reduced pretension. This adjustment or removal of pole spacers would help reducing the weight of the rotor. Thereby the resonance frequency could be increased. In addition to that the air-gap above adjusted pole spacers would increase, which facilitates the axial air-flow and improves cooling of the motor. So with adjusted pole spacers the mechanical air-gap of the motor could be reduced.

The proposed technique apart from its evident technical advantages also offers attractive economical benefits. The steel wire is fairly cheap compared to carbon fiber composites. Besides, if no impregnation is used, the steel wire bandage could be easily utilized. It has been mentioned earlier that the proposed technique permits failures of the wire during winding if temporary fixations are used. This means that the winding could also consist of stretches of steel wire that has previously been used in another machine. Probably a more attractive example would be utilization of a steel wire bandage of a large rotor for steel wire bandages for a few smaller rotors.

A short description of mechanical design of containment bandages and magnetic cores is provided. The wires wound under tension are meant to provide contact pressure. Since wires are situated at the periphery of the rotor, they are under action of centrifugal forces during operation. Stress in the metal wire due to centrifugal forces can be estimated as follows:

$$\sigma_{centr}[MPa] = \emptyset_{rot}[m]^2 \cdot \left(\frac{rpm}{1000}\right)^2 \cdot \frac{\rho[kg/m^3]}{7800} \cdot 21.3973 \qquad (1)$$

where $\emptyset_{rot}$ [m] is diameter of the rotor at the location of the wire in meters, rpm is turning speed of the rotor in revolutions per minute, $\rho[kg/m^3]$ is density of the material of the wire.

Speed at the rotor surface of high-speed machines usually exceeds 150 m/s. Stress corresponding to this speed is equal to 175.5 MPa. In order for this concept to work the pretension in the wire must exceed the centrifugal stress. Wires made of high carbon steels can have the strength of more than 2500 MPa. With 80% pretension such a wire would be capable of sustaining radial speed up to 500 m/s. Some wires of modern grades have strength as high as 4000 MPa. So with these grades achievable radial speed could be even higher.

Magnetic cores which have to be designed only to sustain centrifugal stresses have to be wound with pretension exceeding corresponding centrifugal stresses.

Containment bandages are meant to impose contact pressure on a rotor. So they can be considered as a source of contact pressure. Steel has relatively high density. Therefore the stress due to centrifugal forces cannot be neglected. As turning speed increases, the contact pressure provided by the steel wire reduces. The contact pressure of steel wire at a certain turning speed is determined by the operational stress that is a difference between the original pretension applied during winding and centrifugal stress:

$$\sigma_{oper} = \sigma_{pretension} - \sigma_{centr} \qquad (2)$$

The pressure P provided by a layer of thickness h of such a flat wire could be determined as:

$$P_{layer} = \sigma_{oper} \cdot \frac{2h}{\emptyset_{rot}} \qquad (3)$$

Let us consider a flat wire with cross-section h×w and let F be a pretension force applied to the wire.

$$\sigma_{pretension} = \frac{F}{h \cdot w} \qquad (4)$$

From equations above it can be derived which pretension force would be necessary in order to achieve a specified contact pressure by the considered layer:

$$F = P_{layer} \cdot \frac{w \cdot \emptyset_{rot}}{3} + h \cdot w \cdot \sigma_{centr} \qquad (5)$$

The total contact pressure of a bandage would be a superposition of contact pressures of individual layers, so the contact pressures of the layers should be added up. It is possible to use different strategies for designing containment bandages. It is possible to design containment bandages for a constant pretension, which might be easier for implementation. However since centrifugal stresses would increase with the radius, a contribution of external layers into the contact pressure of the bandage would be somewhat smaller compared to internal layers. Therefore it is also possible to vary the pretension in order to maintain constant operational contact pressure of each layer.

The calculations above are meant for clarification only, but should not be considered as any kind of restriction for the proposed method. For instance, a winding with a flat wire with round edges should be calculated somewhat differently.

The proposed technique is not bound to a specific type of material. Each material has its own preferable field of application as far as this invention is concerned. It can be easily demonstrated that the proposed technique offers a lot of flexibility for a designer. In high speed machines it is important to achieve high contact pressures and at the same time minimize dimensions and the weight on the bandage. So the strongest wires or ribbons made of high carbon steels should be utilized. Amorphous ribbons having strength up to 2 GPa are also usable candidates for the proposed technique.

In some applications it might be important to achieve local saturation of the bandage in order to, for instance, decrease leakage flux. This is applicable for rotors with a secondary winding and for rotors with permanent magnets. This goal could be achieved by selecting sufficiently thin wire or a ribbon. In addition to that a material could be selected having lower saturation level. For instance, in some cases an amorphous ribbon could be a preferable option not only because of its low thickness, but also because of lower saturation flux density compared to steel. A similar effect could be achieved by winding with wires of permeable and non-permeable materials in parallel. If permanent magnets are used in the rotor and leakage through bandage must be absolutely excluded, then just a non-magnetic metal wire could be used, because such machines are less sensitive to the value of the air-gap. Non-permeable wires could also be used to introduce non-magnetic layers into the bandage. For instance, if the bandage must be thick for mechanical reasons, but this thickness would be excessive from magnetic point of view, then a part of the bandage could be manufactured using a non-permeable wire. It is also possible to manufacture the first layers of the bandage from non-permeable wire in order to create a non-magnetic gap between elements of the rotor and permeable layers of bandage. Such elements could be rotor teeth, magnets and so on. This could also be an effective measure to reduce the leakage flux. The non-permeable wire should have an insulation coating in order to prevent eddy current losses in the bandage.

If high pretensions are not required, then electrical steel wires or ribbons could be used. Electrical steels are mechanically weaker, but have higher electrical resistivity, which could help reducing the losses. Size of the wire must be selected in accordance with operating frequency and type of control used in the machine.

With respect to coating, either organic or non-organic coating could be applied to the wire depending on the expected maximum operating temperature in the motor.

The invention claimed is:

1. A method of manufacturing a multilayer metal wire or ribbon bandage over an operational zone of a rotor of an electrical machine, wherein the operational zone of the rotor comprises any of following elements: a) permanent magnets; b) a squirrel cage; c) a laminated core; d) a laminated core with slots; e) an electrical winding; and where the metal wire or ribbon bandage possesses the combination of properties:
   a) the metal wire or ribbon bandage is restricted by side rings, which are either separate parts of the rotor or inseparable parts of the rotor;
   b) the metal wire or ribbon bandage is carried out with a round, flat, rectangular or hexagonal wire or a ribbon of a magnetically permeable material and the wire or ribbon is provided with an organic or inorganic insulation or coating in accordance with an expected maximum operating temperature;
   c) winding with the metal wire or ribbon is conducted in layers without overlapping between turns and either with axial mechanical contact between turns, in case of the metal wire, or either with axial mechanical contact or with a minimal axial gap between turns in case of the metal ribbon;

and wherein the method of manufacturing the metal wire or ribbon bandage comprises a combination of steps:
a) providing said rotor having an operational zone and side rings;
b) fixation of a first end of the metal wire or ribbon, wherein the fixation is carried out by means of one of methods:
  1) fixation in the operational zone of the rotor, comprising the steps of:
    i. reducing or removing a pretension to the metal wire or ribbon;
    ii. applying a temporary fixation to the first end of the metal wire or ribbon;
    iii. performing a few turns of a preliminary winding with increased axial step towards a beginning of a first layer of the winding;
    iv. gradually increasing the pretension applied to the metal wire or ribbon;
  2) fixation in a slot in the operational zone of the rotor, comprising the steps of:
    i. reducing or removing applied pretension to the metal wire or ribbon;
    ii. locating and securing the first end of the metal wire or ribbon in the slot in the operational zone;
    iii. performing a few turns with the metal wire or ribbon in the slot with simultaneous increase of the pretension applied to the metal wire or ribbon;
    iv. applying a full pretension to the metal wire or ribbon when it reaches a diameter of the operational zone;
  3) fixation outside the operational zone of the rotor, comprising the steps of:
    i. removing or reducing pretension applied to the metal wire or ribbon;
    ii. securing the first end of the metal wire or ribbon outside the operational zone by applying a temporary fixation;
    iii. performing a few turns of a preliminary winding with the metal wire or ribbon;
    iv. guiding the metal wire or ribbon to the operational zone through an axial slot in a side ring;
    v. increasing the pretension applied to the metal wire or ribbon up to a nominal value;
    vi. performing at least two complete layers of winding in the operational zone;
    vii. after starting a third layer of the winding, conducting the following steps:
      a. interrupting the winding;
      b. removing the temporary fixation outside the operational zone;
      c. cutting and removing the preliminary winding from the rotor;
c) winding under pretension with metal wire or ribbon in the operational zone;
d) fixation of the metal wire or ribbon after finishing the winding without loss of pretension in the metal wire or ribbon, where this fixation is carried out by means of:
  fixing the second end of the metal wire or ribbon inside the operational zone, comprising the steps of:
    i. interrupting the winding after completing a last layer of the metal wire or ribbon bandage;
    ii. installing a temporary external radial mechanical fixation;
    iii. cutting the metal wire or ribbon next to the temporary fixation;

iv. manufacturing a fiber-reinforced composite bandage over the metal wire or ribbon bandage or a part of it containing last turns of the last layer;
v. removing the temporary fixation;
vi. removing loose turns of the metal wire or ribbon uncovered by the fiber-reinforced composite bandage;

or fixing the second end of the metal wire or ribbon outside the operational zone.

2. The method according to claim 1 wherein at least one of the side rings is provided with axial slots and fixation of the second end of the metal wire or ribbon, outside the operational zone, is carried out by means of one of methods:

1) a radial fixation of the second end of the metal wire or ribbon comprising the steps of:
   i. fixing last turns of the metal wire or ribbon wound in the operational zone by using an external radial mechanical fixation;
   ii. reducing the pretension in the metal wire or ribbon;
   iii. guiding the metal wire or ribbon out of the operational zone through a slot in a side ring;
   iv. winding a few turns of an intermediate winding;
   v. removing previously installed external fixation;
   vi. proceeding with the intermediate winding and completing two layers;
   vii. installing external radial mechanical fixation over last turns of the intermediate winding;
   viii. installing a metal retaining sleeve providing pressure over the intermediate winding;
   ix. removing the external radial mechanical fixation;
   x. removing last turns of the intermediate winding;

2) an axial fixation of the second end of the metal wire or ribbon comprising the steps of:
   i. reducing the pretension in the metal wire or ribbon;
   ii. passing the metal wire or ribbon through a slot in a side ring out of the operational zone;
   iii. passing the metal wire or ribbon through another slot in the side ring back into the operational zone;
   iv. winding a few turns with pretension over the operational zone;
   v. fixing last turns using an external radial mechanical fixation;
   vi. cutting the metal wire or ribbon;
   vii. installing a ring next to the side ring, clamping the metal wire or ribbon with axial pressure;
   viii. removing the external radial mechanical fixation from the bandage;
   ix. removing the metal wire or ribbon up to the axial fixation point;

3) fixation of the second end of the metal wire or ribbon in a fixation space, comprising the steps of:
   i. fixing last turns of the metal wire or ribbon wound in the operational zone by using an external radial mechanical fixation;
   ii. cutting the metal wire or ribbon and making a loop on its end;
   iii. passing the metal wire or ribbon through a slot in a side ring out of the operational zone;
   iv. inserting the metal wire or ribbon into a fixation space;
   v. filling up the fixation space with a liquid metal or a polymer in accordance with expected operating temperature of the rotor;
   vi. removing the external radial mechanical fixation;

wherein the fixation space is provided either by two holes, intersecting at an angle, or by two overlapping holes with at least one of these holes having a thread;

4) fixation of the second end of the metal wire or ribbon outside the operational zone comprising the steps of:
   i. interrupting the winding after completing the last layer of the metal wire or ribbon bandage;
   ii. passing the metal wire or ribbon out of the operational zone through a slot in a side ring;
   iii. performing a few turns;
   iv. installing a temporary radial mechanical fixation over the metal wire or ribbon turns;
   v. cutting the metal wire or ribbon after the fixation;
   vi. manufacturing a fiber-reinforced composite bandage over the metal wire or ribbon bandage or a part of it containing last turns of the last layer;
   vii. removing the temporary radial fixation;
   viii. removing the turns of the metal wire or ribbon outside the operational zone uncovered by the fiber-reinforced composite bandage;

5) fixation of the second end of the metal wire or ribbon outside the operational zone comprising the steps of:
   i. interrupting the winding after completing the last layer of the metal wire or ribbon bandage;
   ii. passing the metal wire or ribbon out of the operational zone through a slot in a side ring;
   iii. performing a few turns;
   iv. installing a temporary radial mechanical fixation over said turns;
   v. cutting the metal wire or ribbon at the fixation;
   vi. manufacturing a fiber-reinforced composite bandage over the metal wire or ribbon between the temporary fixation and the side ring;
   vii. removing the temporary radial fixation;
   viii. removing the turns of the metal wire or ribbon outside the operational zone uncovered by the fiber-reinforced composite bandage.

3. The method according to claim 1 wherein, if in step b) of claim 1 a preliminary winding is used for fixation, inside the operational zone, of the first end of the metal wire or ribbon, then after applying a few turns of the first layer of the metal wire or ribbon, when the turns of the preliminary winding underneath the first layer are properly secured, interrupting the winding, cutting and removing a rest of the preliminary winding that is uncovered by the turns of the first layer from the operational zone.

4. The method according to claim 1 wherein step c), winding under pretension with metal wire or ribbon in the operational zone, comprises the steps of:
1) pouring liquid polymer onto the operational zone and onto wound layers as the winding in the operational zone is being performed;
2) integrating a metal conductive layer into the metal wire or ribbon bandage including the steps of:
   i. wrapping a metal sheet or a few layers of conductive foil around a complete layer of the metal wire bandage;
   ii. winding at least one layer of metal wire or ribbon over the conductive layer.

5. The method according to claim 1 wherein at least one of the side rings is provided with axial slots and wherein step c), winding under pretension with metal wire or ribbon in the operational zone, comprises the steps of:
1) introducing radial intermediate fixations of the metal wire or ribbon outside the operational zone comprising the steps of:
   i. reducing the pretension in the metal wire or ribbon;
   ii. winding with the metal wire or ribbon through a slot in a side ring out of the operational zone;
   iii. winding a few turns of an intermediate winding;

iv. proceeding with the intermediate winding and completing two layers;
v. installing external mechanical fixation over the intermediate winding;
vi. passing the metal wire or ribbon through a slot in the side ring and reaching the operational zone;
vii. increasing the pretension back to a nominal value or;
2) introducing axial intermediate fixations of the metal wire or ribbon outside the operational zone comprising the steps of:
i. reducing the pretension in the metal wire or ribbon;
ii. passing the metal wire or ribbon through a slot in a side ring out of the operational zone;
iii. passing the metal wire or ribbon through another slot in the side ring back into the operational zone;
iv. installing an external mechanical fixation clamping the metal wire or ribbon against the side ring or otherwise fixing the metal wire or ribbon at the side ring;
v. increasing the pretension of the metal wire or ribbon back to the nominal value.

6. The method according to claim 1 wherein a set of parallel metal wires or ribbon is used for the winding with every metal wire or ribbon provided with a separate pretension system.

7. The method according to claim 1 wherein the metal wire or ribbon bandage is post-impregnated with a polymer.

8. The method according to claim 1 wherein the metal wire or ribbon bandage is wound with insulation-coated wires of magnetically permeable and magnetically non-permeable materials in parallel.

9. The method according to claim 1 wherein internal layers of the wire or ribbon bandage are wound with insulation-coated wire of a magnetically non-permeable material.

10. The method according to claim 1 wherein at least some of the layers of the metal wire or ribbon bandage are wound with insulation-coated amorphous ribbon.

11. The method according to claim 1 wherein the metal wire or ribbon bandage contains a single layer of metal wire of magnetically permeable material.

* * * * *